United States Patent
Strack

[11] 3,902,880
[45] Sept. 2, 1975

[54] METHOD OF MAKING A FIBER OPTIC ILLUMINATING HALO

[75] Inventor: Richard R. Strack, Southbridge, Mass.

[73] Assignee: American Optical Corporation, Southbridge, Mass.

[22] Filed: Jan. 16, 1974

[21] Appl. No.: 433,633

[52] U.S. Cl. ............... 65/4; 65/31; 65/61; 65/DIG. 7; 350/96 B
[51] Int. Cl.² ................... C03C 23/20; C03C 15/00
[58] Field of Search ............... 65/4, 31, 61, DIG. 7; 350/96 B

[56] References Cited
UNITED STATES PATENTS

| | | | |
|---|---|---|---|
| 2,995,970 | 8/1961 | Hick, Jr. et al. | 65/61 X |
| 3,278,283 | 10/1966 | Bazinet, Jr. | 65/61 X |
| 3,554,721 | 1/1971 | Gardner | 65/4 |
| 3,574,582 | 4/1971 | Siegmund et al. | 65/61 X |
| 3,674,452 | 7/1972 | Strack | 65/31 |

Primary Examiner—S. Leon Bashore
Assistant Examiner—Frank W. Miga
Attorney, Agent, or Firm—H. R. Berkenstock, Jr.; William C. Nealon

[57] ABSTRACT

An illuminating halo for use in conjunction with an image-transporting fiber optic bundle. The halo is formed of a multiplicity of light-conducting fibers each having a leachable outer cladding. The fibers are juxtapositioned circumferentially about the outer side of a supporting tube and the resulting assembly is heated and drawn to the diametral size desired of the halo. The fibers are then leached free of the tube over all but one end thereof which is cut or broken away to remain as a bushing for the halo.

6 Claims, 7 Drawing Figures

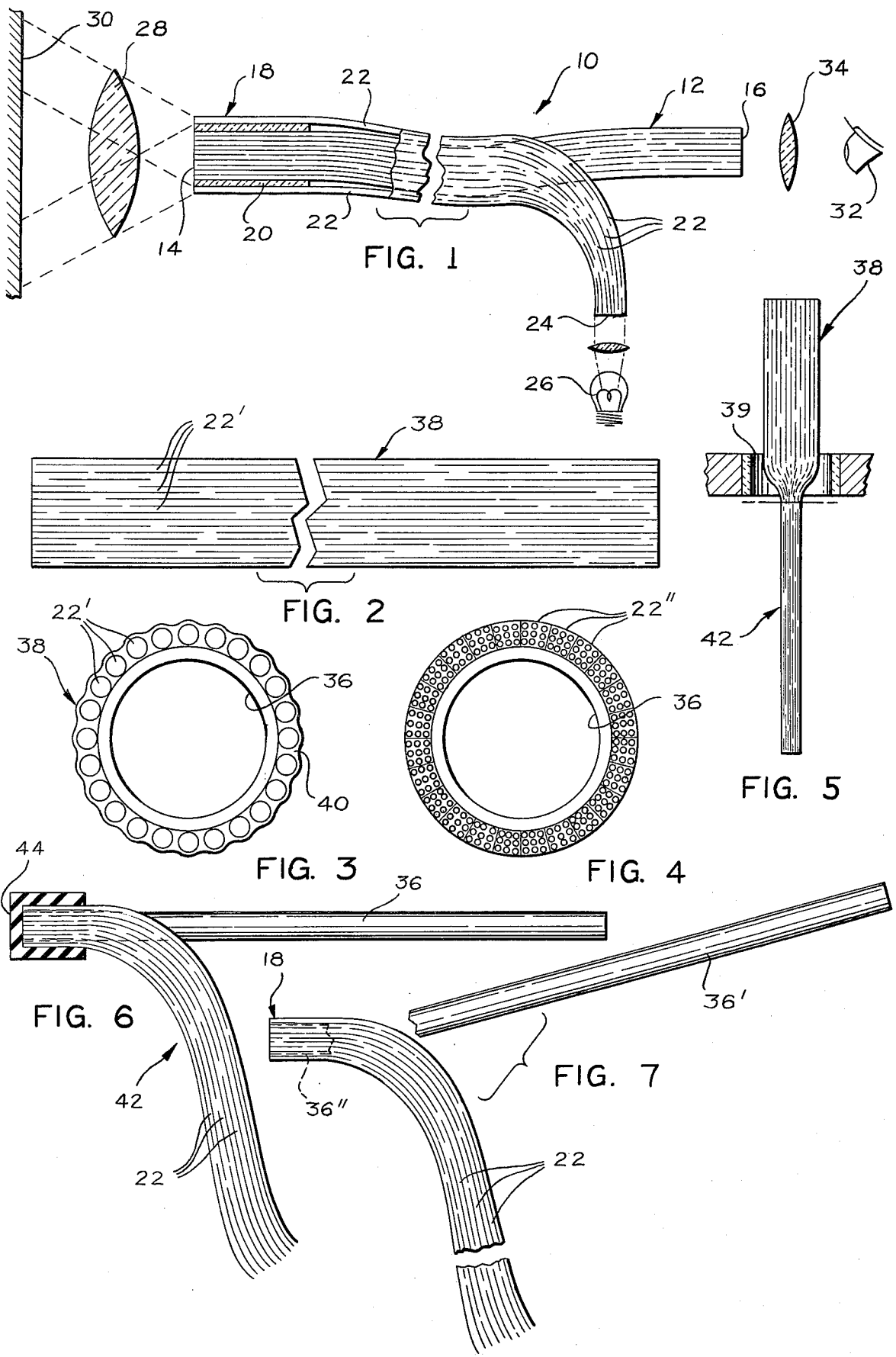

METHOD OF MAKING A FIBER OPTIC ILLUMINATING HALO

BACKGROUND OF THE INVENTION

1. Field of the Invention

Fiber optic illuminating devices with particular reference to an illuminating halo for use in conjunction with an image transporting fiber optic bundle and method of making the same.

2. Description of the Prior Art

Prior art methods for fabricating illuminating halos involved manually assembling the light-transporting fibers around a supporting bushing and cementing the fibers in place against the bushing.

Since the fibers of halo illuminators are usually extended through flexible probes of fiber optic endoscopes such as laryngoscopes, bronchoscopes and intravenous or intracardiac examining probes it is essential, and critical in some cases, that the fibers of the halo device be highly flexible and thus correspondingly fine and fragile. Accordingly, prior art manual assembly procedures are attended by problems of fiber entanglement and/or breakage accompanied by difficulties in obtaining uniform and proper thickness of halo fibers around the supporting bushing according to fitting requirements of instruments intended to receive the illuminators. Still further are the prior art drawbacks of undue lengthiness, tediousness and costliness of processing.

These problems and related difficulties seriously limit the production and commercialization of the subject devices and instruments depending thereupon for completion.

A principle object of the present invention is to provide halo illuminators of improved construction and further to provide a process for manufacturing these devices which is adaptable to large or small production outputs and requires, in either case, only a minimum of time, expense and skill to implement while offering an assurance of repeated duplication of the improved end result.

SUMMARY OF THE INVENTION

The aforementioned objectives and their corollaries are accomplished by a novel technique of forming illuminating halos of a multiplicity of relatively large and easily handled light-conducting fibers each having a leachable outer cladding and arranging the fibers in side-by-side relationship circumferentially about the outer side of a supporting tube having a much larger diametral size than that desired of the finished halo. The resulting assembly is then heated and drawn as a unit to the diametral size desired of the finished halo and its fibers are leached free of the tube over all but one end thereof. The major portion of the tube is cut or broken away from its end having the fibers still fused thereto. The cut or broken away portion is discarded and the remaining end portion is retained as a bushing for supporting and reinforcing the fiber optic halo.

The halo thus formed is adapted to receive an image transporting bundle of optical fibers longitudinally within its bushing when used as an illuminator in a fiberscope instrument. Its leached fibers permit free flexing of the fiberscope while ends remaining attached to the bushing provide the annular light-emitting face of the fiberscope.

Details of the invention will be better understood by reference to the following description when taken in conjunction with the accompanying drawings.

DESCRIPTION OF THE DRAWING

FIG. 1 is a partially cross-sectioned diagrammatic illustration of an image-transporting fiberscope device incorporating a preferred embodiment of the invention;

FIG. 2 is a side elevational view of a tubular assembly of fiber optic components from which a halo illuminator may be produced according to the present invention;

FIG. 3 is an end view of the assembly shown in FIG. 2;

FIG. 4 is a view similar to FIG. 3 of a modified form of fiber optic assembly which may be used to form a halo illuminator according to the invention;

FIG. 5 is a diagrammatic illustration of a step of heating and drawing the assembly of FIG. 2;

FIG. 6 is a side elevational view of a partially completed embodiment of the invention; and FIG. 7 illustrates a step of completing the embodiment of the invention shown in FIG. 6 according to one aspect of the invention.

DESCRIPTION OF THE PREFERRED EMBODIMENTS

Fiber optic illuminating halos each typically comprise a group of long light-conducting fibers, either of the monofilament or multifiber type, having their corresponding one ends arranged in parallel side-by-side relationship circumferentially about the outer surface of a relatively short supporting bushing. When used in conjunction with image-transporting fiber optic bundles of fiberscope devices such as laryngoscopes, bronchoscopes and/or intravascular and intracardiac examining probes, the bushing of the halo illuminator is fitted over the image receiving distal end of the image-transporting bundle and remaining lengths of its fibers, usually being individually independently flexible, are extended along the bundle to a point adjacent its opposite proximal end. They are then gathered together usually relatively tightly with their corresponding end faces mosaically forming a light receiving face of the system. Light directed upon this face is conducted through the fibers by internal reflection and emitted circumferentially about the distal end of the image-transporting bundle as a halo of light which illuminates objects forwardly thereof. An optical objective images the illuminated objects upon the distal end of the image transporting bundle for conduction through the bundle to a viewing location proximally thereof.

A fiberscope system incorporating an illuminating halo of the type relating to this invention is diagrammatically illustrated in FIG. 1. The fiberscope system 10 of FIG. 1 includes image transporting fiber bundle 12 having image-receiving face 14 at its distal end and image-emitting face 16 at its opposite porximal end. Illuminating halo 18 having supporting bushing 20 is fitted over the proximal end 14 of bundle 12. Its fibers 22 are extended along bundle 21 to a point adjacent proximal end 16 where they are gathered to one side of bundle 12 and grouped together to form light-receiving face 24. Light emitted from a light source 26 is, when received at face 24, conducted through fibers 22 and emitted circumferentially about the distal image-receiving face 14 of bundle 12. This light is emitted in an outwardly expanding cone from each fiber 22 and illuminates objects forwardly of end 14 of bundle 12 generally as illustrated by dot-dash outline in FIG. 1. A suitable optical objective, i.e. a convex lens 28, may be used to form an image of an object at plane 30 upon end 14 of bundle 12 for transmittance through bundle 12 and viewing at end 16 either directly with the eye 32 or with the assistance of a magnifying eyepiece 34.

According to the present invention, the illuminating halo 18 is formed of glass clad fibers 22 which are fused to bushing 20, also formed of glass. Fibers 22, whether of the monofilament type or multifiber type are comprised of core glasses of high refractive index, i.e. in the range of from 1.5 to 1.81, each surrounded by a relatively thin cladding of relatively low refractive index material, i.e. in the range of from 1.48 to 1.52.

Illuminating halo 18 is produced according to the invention of an initially relatively large assembly of its component parts which is heated and drawn to the reduced size desired of the ultimate illuminator.

Such an assembly is illustrated in FIGS. 2 and 3 as comprising a glass supporting tube 36 having relatively large fibers 22' arranged in side-by-side relationship circumferentially about the outer side of tube 36. In the embodiment shown in FIGS. 2 and 3, fibers 22' are of the monofilament type each having a core part of high refractive index glass, a relatively thin first cladding of material of a lower refractive index than the core and a second cladding of glass or metallic material which is leachable. The second cladding material is fusible to tube 36 and the resulting assembly 38 may, at this stage of the process, be heated sufficiently to lightly fuse fibers 22' together and to tube 36 as an integral unit with the second cladding material forming a connecting matrix 40 (see FIG. 3). Alternatively, the assembly of fibers 22' and tube 36 may be mechanically clamped together, tied or cemented with an adhesive such as cellulose nitrate which will burn off during a subsequent heating and drawing operation.

Fibers 22' having the leachable second claddings may alternatively each be of the multifiber type 22" (FIG. 4), i.e. each comprising a plurality of cores of high refractive index material all interconnected by a material of lower refractive index and surrounded with a layer of leachable material. Those interested in details concerning materials and techniques used in the manufacture of fibers such as 22' and/or 22" may refer to U.S. Pat. Nos. 3,004,368 and 3,624,816.

Having fabricated assembly 38 using fibers 22' or 22" of relatively large diametral size (e.g. 0.025 inch or larger) having limited flexibility in lengths of from 1 to 3 feet for ease of handling and ready placement in accurately aligned side-by-side relationship longitudinally of tube 36 of approximately the same length, assembly 38 is heated and drawn to a reduced cross-sectional size. This may be accomplished by lowering assembly 38 gradually through a suitable annular heating element 39 and simultaneously continuously drawing the heated portion of the assembly at a rate controlled according to the diametral size desired of the drawn portion. A typical assembly 38 may have an outer diametral size of one inch or more and be drawn to a reduced diametral size of, for example, one quarter inch or less. Drawing temperatures and rates are preselected according to the usual practice in this aspect of the fiber optic art relative to which U.S. Pat. Nos. 3,148,967; 3,550,163 are exemplary. The melting temperatures of materials used in the fabrication of fibers 22' or 22" are major factors in determining drawing temperatures and rates.

Following the drawing of assembly 38 to the reduced cross-sectional size desired of illuminator 18, a section 42 of the drawn portion of assembly 38 is removed for completion as the illuminator.

One end of section 42 is covered with a cap 44 (FIG. 6) of a material, e.g. wax, which is resistant to attack by fiber leaching solutions such as hydrochloric acid or sodium hydroxide. The whole section 42 is then immersed in a leaching solution which is appropriate for removing matrix 40 from portions of fibers 22' or 22" which are exposed thereto. Hydrochloric acid may be used for removing a matrix of leachable glass and sodium hydroxide is useful in leaching a metallic matrix.

Upon removal of the fiber connecting matrix 40, fibers 22' or 22" become released from each other and from tube 36 as free fibers 22 (FIG. 6). Illuminator 18 is completed by removing cap 44 and cutting or breaking the exposed portion of tube 36 away from its fused attachment with fibers 20 adjacent the transition between fused and unfused portions of fibers 20, generally as illustrated in FIG. 7. The separated portion 36' of tube 36 is discarded and its remaining portion 36" (FIG. 7) is retained as supporting bushing 20 of illuminating halo 18 (FIGS. 7 and 1).

It is pointed out that the use of cap 44 during the aforementioned operation of leaching may be dispensed with by immersing section 42 in the appropriate leaching solution only to the extent required for the release of fibers 22, keeping section 36" of tube 36 and corresponding portions of fibers 22 free of the leaching medium. Furthermore, the step of separating portion 36' or tube 36 from its portion 36" (FIG. 7) may be dispensed with by using a tube 36 in assembly 38 which is formed of a leachable material similar or identical to that of matrix 40, i.e. a material which is leachable upon exposure to the leaching solution used to free fibers 22. Thus, by continuing the leaching operation described hereinabove with respect to FIG. 6 beyond the point of freeing fibers 22, portion 36' of tube 36 may be leached away rather than broken or cut. Following all leaching operations, the resulting illuminating halo 18 is preferably cleansed of residue of the leaching medium to prevent unnecessary erosion of fibers 22. Typical cleansing operations are described in the aforementioned U.S. Pat. Nos. 3,004,368 and 3,624,816.

Opposite ends of the fibers 22 of illuminating halo 18 may be ground and polished to enhance its light transmitting capabilities.

I claim:

1. The method of making a fiber optic illuminating halo of a given outer diametral size comprising:

assembling a plurality of relatively large diameter optical fibers in side-by-side relationship circumferentially about the outer side of a hollow supporting tube of larger outer diametral size and thickness than that desired of said halo, said fibers being extended longitudinally of said tube and each having an outer cladding or leachable material, said cladding material being heat softenable and fusible to said tube;

heating, fusing and drawing the assembly of said tube and fibers longitudinally to said given outer diametral size desired of said halo;

leaching said cladding material away from said fibers and tube throughout all but one end of said fused drawn assembly to free said fibers from a corresponding portion of said tube and from each other; and removing said portion of said tube under the corresponding portion from the leached assembly and discarding same whereby its remaining portion with corresponding ends of fibers fused thereto comprises said illuminating halo.

2. The method according to claim 1 wherein said step of leaching is performed by covering one end of said drawn assembly with a material resistant to leaching and immersing the drawn assembly in a leaching medium.

3. The method according to claim 1 wherein said step of leaching is performed by immersing substantially all but said one end of said fused drawn assembly in a leaching medium.

4. The method according to claim 1 wherein said step of removing and discarding said portion of said tube from said leached assembly is performed by cutting through said tube adjacent said fused one end of said leached assembly.

5. The method according to claim 1 wherein said step of removing and discarding said portion of said tube from said leached assembly is performed by breaking said tube away from said fused one end of said leached assembly.

6. The method according to claim 1 wherein said tube is formed of a leachable material and said step of removing and discarding said portion of said tube is performed by exposing same to a leaching medium.

* * * * *